(12) United States Patent
Makarow et al.

(10) Patent No.: US 11,131,370 B2
(45) Date of Patent: Sep. 28, 2021

(54) CONTROLLING DEVICE FOR THE MECHANICAL ACTUATING OF A COMPONENT

(71) Applicant: Mahle International GmbH, Stuttgart (DE)

(72) Inventors: Eugen Makarow, Ludwigsburg (DE); Edgar Salfeld, Lichtenwald (DE); Florian Wetzel, Baltmannsweiler (DE)

(73) Assignee: Mahle International GmbH

( * ) Notice: Subject to any disclaimer, the term of this patent is extended or adjusted under 35 U.S.C. 154(b) by 130 days.

(21) Appl. No.: 16/353,060

(22) Filed: Mar. 14, 2019

(65) Prior Publication Data

US 2019/0285153 A1    Sep. 19, 2019

(30) Foreign Application Priority Data

Mar. 15, 2018 (DE) .......................... 102018203998.4

(51) Int. Cl.
| | |
|---|---|
| *F16H 27/02* | (2006.01) |
| *F16H 29/02* | (2006.01) |
| *F16H 29/20* | (2006.01) |
| *F16H 35/00* | (2006.01) |
| *F16H 19/00* | (2006.01) |
| *F16H 1/16* | (2006.01) |

(Continued)

(52) U.S. Cl.
CPC .............. *F16H 35/00* (2013.01); *F16H 1/16* (2013.01); *F16H 1/203* (2013.01); *F16H 19/001* (2013.01); *F16H 57/023* (2013.01); *F16H 57/039* (2013.01); *F16H 2035/006* (2013.01); *F16H 2057/0056* (2013.01); *F16H 2057/02034* (2013.01)

(58) Field of Classification Search
CPC ...... F16K 31/043; F02D 9/1065; F16H 33/02; F16H 2025/2068; F16H 2035/006; F16H 35/00

See application file for complete search history.

(56) References Cited

U.S. PATENT DOCUMENTS

| 4,482,847 | A | | 11/1984 | Rudich, Jr. et al. |
| 5,950,765 | A | * | 9/1999 | Pearson .................. F16H 19/00 185/40 R |

(Continued)

FOREIGN PATENT DOCUMENTS

| DE | 34 90 071 T1 | 6/1985 |
| DE | 10 2013 109 997 A1 | 3/2015 |

(Continued)

OTHER PUBLICATIONS

English abstract for DE-10 2013 109 997.
English abstract for DE-10 2016 106 066.
English abstract for JP-2007-259 574.

*Primary Examiner* — Jake Cook
(74) *Attorney, Agent, or Firm* — Fishman Stewart PLLC

(57) ABSTRACT

A controlling device may include an actuator for mechanically actuating a component. The actuator may be driven by an electric motor. The controlling device provides a return spring. In the case of a failure of the electric motor, the return spring brings about a shifting of the actuator into a starting position. The return spring may be mounted in the controlling device so that it prestresses the actuator into the starting position with a predetermined minimum restoring force.

16 Claims, 2 Drawing Sheets

(51) Int. Cl.
*F16H 1/20* (2006.01)
*F16H 57/039* (2012.01)
*F16H 57/023* (2012.01)
F16H 57/02 (2012.01)
F16H 57/00 (2012.01)

(56) References Cited

U.S. PATENT DOCUMENTS

| | | | | |
|---|---|---|---|---|
| 6,155,533 A | * | 12/2000 | Semeyn | F02D 11/107 |
| | | | | 251/129.12 |
| 6,276,664 B1 | * | 8/2001 | Keller | F02D 11/10 |
| | | | | 251/129.12 |
| 2004/0129102 A1 | * | 7/2004 | Rennen | F16K 31/53 |
| | | | | 74/425 |
| 2006/0231072 A1 | * | 10/2006 | Saito | F02D 9/1065 |
| | | | | 123/396 |
| 2008/0053808 A1 | * | 3/2008 | Peffley | F16K 31/043 |
| | | | | 200/400 |
| 2013/0140477 A1 | * | 6/2013 | Shimane | H02K 7/116 |
| | | | | 251/129.01 |
| 2015/0137527 A1 | * | 5/2015 | Hattori | E05B 83/30 |
| | | | | 292/144 |
| 2017/0314643 A1 | | 11/2017 | Hudson et al. | |

FOREIGN PATENT DOCUMENTS

| | | |
|---|---|---|
| DE | 10 2016 106 066 A1 | 10/2017 |
| DE | 10 2017 201 985 A1 | 11/2017 |
| JP | 2007-259 574 A | 10/2007 |

* cited by examiner

CONTROLLING DEVICE FOR THE MECHANICAL ACTUATING OF A COMPONENT

CROSS-REFERENCE TO RELATED APPLICATION

This application claims priority to German Application DE 10 2018 203 998.4 filed on Mar. 15, 2018, the contents of which are hereby incorporated by reference in its entirety.

TECHNICAL FIELD

The present invention relates to a controlling device for the mechanical actuating of a component, and a method for mounting such a controlling device.

BACKGROUND

Such a controlling device usually has a housing in which an electric motor is arranged, which has a drive shaft, wherein externally on the housing an arranged actuator is provided for coupling with the component which is to be actuated. In the housing, a gear is arranged which connects the drive shaft in a driving manner to an output shaft, connected to the actuator in a torque-proof manner and penetrating the housing, wherein in the housing a return spring is arranged, which in the case of a failure of the electric motor brings about a shifting of the actuator into a starting position.

Such controlling devices are used for example in the motor vehicle field as actuators for turbocharger or intake manifold applications, in which a blade- or flap controlling device is provided which, as a component which is to be actuated, comprises at least one movably mounted blade or flap, in order to alter a cross-section, which is able to be flowed through, in a fluid-conducting line of a motor vehicle.

The use of a return spring has the advantage that the actuator of the controlling device in the case of a failure of the electric motor is shifted into a predetermined starting position, so that a well-defined state or respectively a failsafe position of the component, which is to be actuated, occurs. In order to transfer the actuator of the controlling device from the predetermined starting position into a predetermined final position, the electric motor from the starting position up to the final position, in addition to the actuation of the component, must additionally also overcome the restoring elastic force of the return spring and must therefore be designed accordingly.

As the restoring elastic force is proportional to the deflection or respectively length change of the return spring and is used in controlling devices, for example return springs with a substantially constant spring rate, the electric motor must be designed so that it can overcome the elastic force in the final position of the actuator, which reaches a maximum here.

In order to enable an economically justifiable manufacture of suitable return springs, particular parameters of the return springs must be approved as manufacturing adjustment. For the manufacturing of return springs with a predetermined spring rate, for example also the length of the respective return springs in the unstressed neutral state must be approved. In controlling devices, such springs are used in an installed position with a fixed dimension, so that through the variation of the lengths of the return springs in the unstressed neutral state the respective return spring undergoes a different deflection in its installed position. Hereby, the restoring elastic force varies in the predetermined starting position. As the return springs are manufactured so that they have a constant spring rate, the restoring elastic force also varies in the predetermined final position. The typical distribution of the restoring elastic force in the predetermined starting position and in the predetermined final position lies in the region of over 10% owing to the manufacturing adjustment. So that the controlling device with such a distribution of the respective elastic force can transfer the actuator completely into the predetermined final position, the electric motor is designed so that the maximally occurring elastic force owing to the distribution is overcome in the predetermined final position. Consequently, for example, the electric motor, the drive shaft and the associated bearing are in many cases overdimensioned.

The present invention is based on the problem of indicating a controlling device of the type designated in the introduction, in which an overdimensioning of the components of the controlling device is avoided and therefore a more favourably priced manufacture of the controlling device is made possible.

This problem is solved according to the invention by the subject of the independent claim. Advantageous embodiments are the subject of the dependent claims.

SUMMARY

The present invention is based on the general idea that the installation position of the return spring in the housing depends on its length on the unstressed neutral state, whereby a neutralizing of the distribution of the restoring elastic force in the predetermined starting position and in the predetermined final position is achieved. Here, the return spring is mounted in the housing so that it prestresses the actuator with a predetermined minimum restoring force into the starting position. For this, not only is a single installation position provided with fixed dimensions, but for example an installation position with variable dimensions and/or several possible installation positions, which respectively have different dimensions. Therefore, the respective return spring can be mounted in an installation position in which the obtained deflection of the return spring is selected from the unstressed neutral state so that the predetermined minimum restoring force is achieved. As the restoring elastic force in the predetermined final position is substantially always the same, the components of the controlling device according to the invention can be optimally dimensioned, so that the entire structure of the controlling device has a lower weight and results in being more compact. Hereby, an overdimensioning of the controlling device is avoided and consequently also a reduction of the manufacturing and material costs is achieved.

The deviations of the lengths of the return springs in the unstressed neutral state from an optimum length have a normal distribution, so that with an economically justifiable manufacture return springs are also always produced, which do not achieve the predetermined minimum restoring force in the predetermined starting position. Typically, hitherto, return springs which bring about a minimum restoring force which is too low or which have a deviation of over 10% of the desired minimum restoring force, were rejected as waste and were not used in the controlling devices. Through the controlling device according to the invention, these return springs can now also be used, so that the unit price of the individual return springs can be further reduced, because for example greater price reductions can be negotiated with manufacturers of return springs.

The predetermined minimum restoring force depends in many cases on the field of use of the controlling device, so that hitherto different return spring variants were used for different fields of use. The controlling device according to the invention can be used with only one return spring type in several fields of use, so that the unit price of the return springs can be reduced still further.

In an advantageous further development of the solution according to the invention, provision is made that the gear has at least one gearwheel, wherein the return spring has a gearwheel holder which is supported on a gearwheel stop formed on the gearwheel, and has a housing holder which is supported onto a housing stop formed on the housing. Provision can be made that the at least one gearwheel is penetrated by the drive shaft and is connected with the latter in a torque-proof manner. It is also conceivable that the gear is configured in a multistage manner and therefore several gearwheels are provided engaging into one another between the drive shaft and the output shaft. A gear transmission is advantageous, because hereby a desired transmission of the torque of the electric motor up to the output shaft can be achieved with a compact and robust structure. The housing stop can be connected to the housing detachably or else non-detachably, wherein provision can also be made that only a partial region of the housing forms the housing stop. Also, the tooth stop can be connected to the gearwheel detachably or non-detachably, wherein provision can be made here that only a partial region of the gearwheel forms the gearwheel stop. Hereby, the controlling device can be manufactured simply and at a favourable cost.

In a further advantageous embodiment of the solution according to the invention, provision is made that the return spring is configured as a spiral spring, which is arranged concentrically to the rotation axis of the gearwheel, wherein the gearwheel holder is arranged at the inner end of the spiral spring, whereas the housing holder is arranged at the outer end of the spiral spring. The spiral spring can be formed from a metallic band which in cross-section of the spiral spring describes at least partially an Archimedean spiral, in which the winding distance between respectively two windings is substantially constant. Here, the winding distance can be selected so that the windings also do not touch one another in the stressed state of the spiral spring, so that no friction losses occur and a wear of the spiral spring is prevented. The use of a spiral spring has the advantage that it can be arranged on the respective gearwheel and therefore a very compact structure of the controlling device is produced.

In an advantageous further development of the solution according to the invention, provision is made that several housing stops are formed on the housing, which are arranged adjacent to one another in circumferential direction with respect to the gearwheel, wherein the housing holder is able to be supported on each of these housing stops, but is only supported on one of these housing stops. Just as in the case of tension springs or pressure springs, also in an economically justifiable manufacture of spiral springs which have a constant spring rate, certain parameters must be approved as manufacturing adjustment, which also includes the length of the spiral spring or respectively of the band in the unbent state. Therefore, in the produced spiral spring a carrier angle between the gearwheel holder and the housing holder varies in the unstressed state of the spiral spring. In order to neutralize this variation of the carrier angle, the housing holder can be inserted into precisely the housing stop at which the spiral spring is prestressed so that it provides the desired restoring force or respectively the desired restoring torque. The housing stops can be provided in the form of recesses and/or projections of the housing of the controlling device. The housing holder can be supported in a form-fitting and/or force-fitting manner on the respective recess and/or the respective projection.

In a further advantageous embodiment of the solution according to the invention, provision is made that several gearwheel stops are formed on the gearwheel, which are arranged adjacent to one another in circumferential direction with respect to the gearwheel, wherein the gearwheel holder is able to be supported on each of these gearwheel stops, but is supported only onto one of these gearwheel stops. In order to achieve a fine adjustment of the minimum restoring force, the housing stops would have to have a very small spacing from one another, whereby the manufacture is made difficult. Through the use of several gearwheel stops, a fine adjustment of the minimum restoring force can be achieved, with no higher demands being made on the manufacture of the housing stops and gearwheel stops.

Provision can be made that the spacing of the housing stops from one another has a different value than the spacing of the gearwheel stops from one another. The gearwheel stops can be configured in the form of recesses and/or projections of the gearwheel. The gearwheel holder can be supported in a form-fitting and/or force-fitting manner on the respective recess and/or on the respective projection.

In an advantageous further development of the solution according to the invention, provision is made that the gearwheel is configured as an output wheel which is connected to the output shaft in a torque-proof manner. Hereby, the return spring is coupled with the output wheel and consequently with the output shaft, without a further gearwheel of the gear being required for the transmission of the minimum restoring force and therefore a reduction of the minimum restoring force through, for example, friction losses between two gearwheels is prevented.

In a further advantageous embodiment of the solution according to the invention, provision is made that the gearwheel is configured as an intermediate wheel which is arranged in the gear between the drive shaft and the output shaft. It is advantageous here that the gearwheel and the associated return spring can be mounted independently of the drive shaft and output shaft in the controlling device. Hereby, for example, the return spring can be placed on the gearwheel before installation in the controlling device, in order to simplify the mounting of the controlling device as a whole and to reduce the manufacturing costs.

In an advantageous further development of the solution according to the invention, provision is made that the gear has a worm drive, which has a worm connected to the drive shaft in a torque-proof manner, and a worm wheel in engagement with the worm, which is connected to a coupling wheel in a torque-proof manner, which is in engagement with an output wheel, which is connected to the output shaft in a torque-proof manner. Through the use of the worm drive, a more compact structure of the controlling device is made possible, because a high transmission between the worm and the worm wheel is able to be achieved and therefore the electric motor used in the worm drive has to provide smaller torques compared to a pure spur gear. Therefore, the electric motor can have smaller dimensions and is more convenient in manufacture. In addition, the drive shaft and the output shaft can be arranged so as to be intersecting, in order to further reduce the dimensions of the controlling device and thereby, for example, to reduce the material costs of the housing.

In a further advantageous embodiment of the solution according to the invention, provision is made that the intermediate wheel is formed by the worm wheel, in order to use as few components as possible and thereby to guarantee a simpler and more favourably priced production of the controlling device, because fewer working steps are required during mounting. In addition, a further reduction of the dimensions of the controlling device is achieved.

In an advantageous further development of the solution according to the invention, provision is made that the output wheel is configured as an intermediate wheel segment, the toothing of which extends in circumferential direction over less than 180°. In many fields of use of the controlling device, provision is made that the component which is to be actuated is to assume two predetermined positions. Therefore, in these cases it is sufficient that the output shaft carries out a rotation about an angle range which corresponds substantially to the angle range between a first and a second predetermined position of the component. Through the configuration of the output wheel as intermediate wheel segment, the component which is to be actuated can be transferred into the two predetermined positions respectively in one another, wherein through the use of the intermediate wheel segment, savings are made with regard to material costs and an even more compact structure of the controlling device is produced.

In addition, the invention relates to a method for mounting a controlling device according to the invention, in which before the torque-proof connecting of the actuator with the output shaft, with stationary drive shaft, the output shaft is rotated for prestressing the return spring until it assumes a mounting rotation position relative to the housing in which the desired minimum restoring force is reached on the output shaft, at which subsequently, with the output shaft held in the mounting rotation position, the actuator is connected to the output shaft in a torque-proof manner. Hereby, controlling devices which have no housing stops and/or gearwheel stops can be arranged in a desired manner. In controlling devices with housing stops and/or gearwheel stops, this method can be used for the fine adjustment of the necessary minimum restoring force. This method can be easily automated, in order to reduce the mounting time of the controlling devices and to achieve a cost advantage.

A further invention provides a method for mounting a controlling device according to the invention, in which the return spring is measured before inserting into the housing, in order to determine its deflection from its unstressed neutral state for generating the minimum restoring force, in which depending on the determined deflection one of the housing stops and/or one of the gearwheel stops is/are selected, in which the return spring is inserted into the housing so that the housing holder is in engagement with the selected housing stop and/or that the gearwheel holder is in engagement with the selected gearwheel stop. Therefore, the respective return spring can be measured before the actual mounting in an upstream manufacturing step, wherein a measurement of torque and/or force can be provided with a torque- and/or force gauge. Through the measuring of the return springs, for example undesired deviations in manufacture can be detected in good time.

A further invention provides a method for mounting a controlling device according to the invention, in which an inserting of the return spring and of the gearwheel into a mounting retainer which is separate with respect to the housing is provided, which mounting retainer has a retainer stop on which the housing holder rests. The method provides for a turning of the gearwheel until the desired minimum restoring force is present in a mounting relative position of return spring and gearwheel. The method further provides for a transferring of the gearwheel and of the return spring in the fixed mounting relative position from the mounting retainer into the housing, wherein the housing holder is brought into engagement with the best suited housing stop for maintaining the mounting relative position. As the structure of the controlling device is designed to be as compact as possible, an adjusting of the housing holder of the return spring within the controlling device is laborious and requires small and precise tools, which may cause higher manufacturing costs. In contrast thereto, an adjusting of the gearwheel and of the return spring outside the housing of the controlling device is possible in a simple and favourably priced manner.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 1:
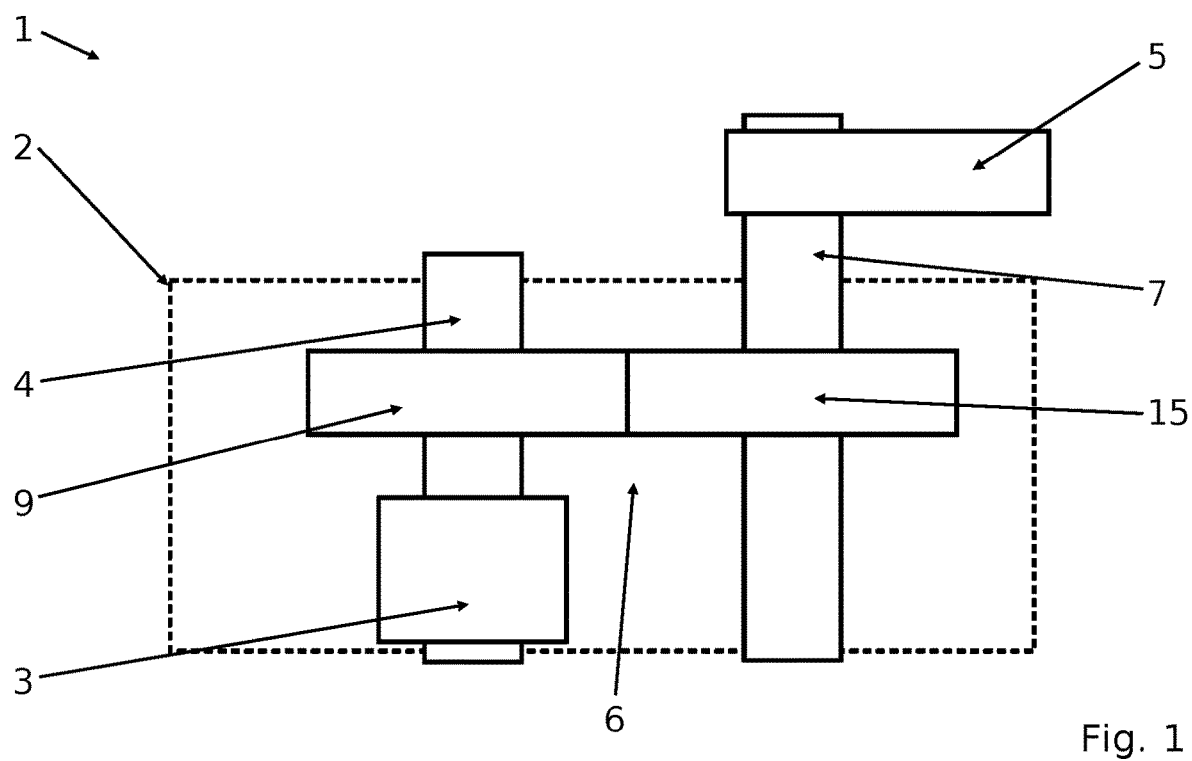
FIG. 1 a side view of a first embodiment of a controlling device according to the invention for the mechanical actuating of a component, FIG. 2 a top view of the controlling device shown in FIG. 1, FIG. 3 a top view of a second embodiment of a controlling device according to the invention.
Figure 2:
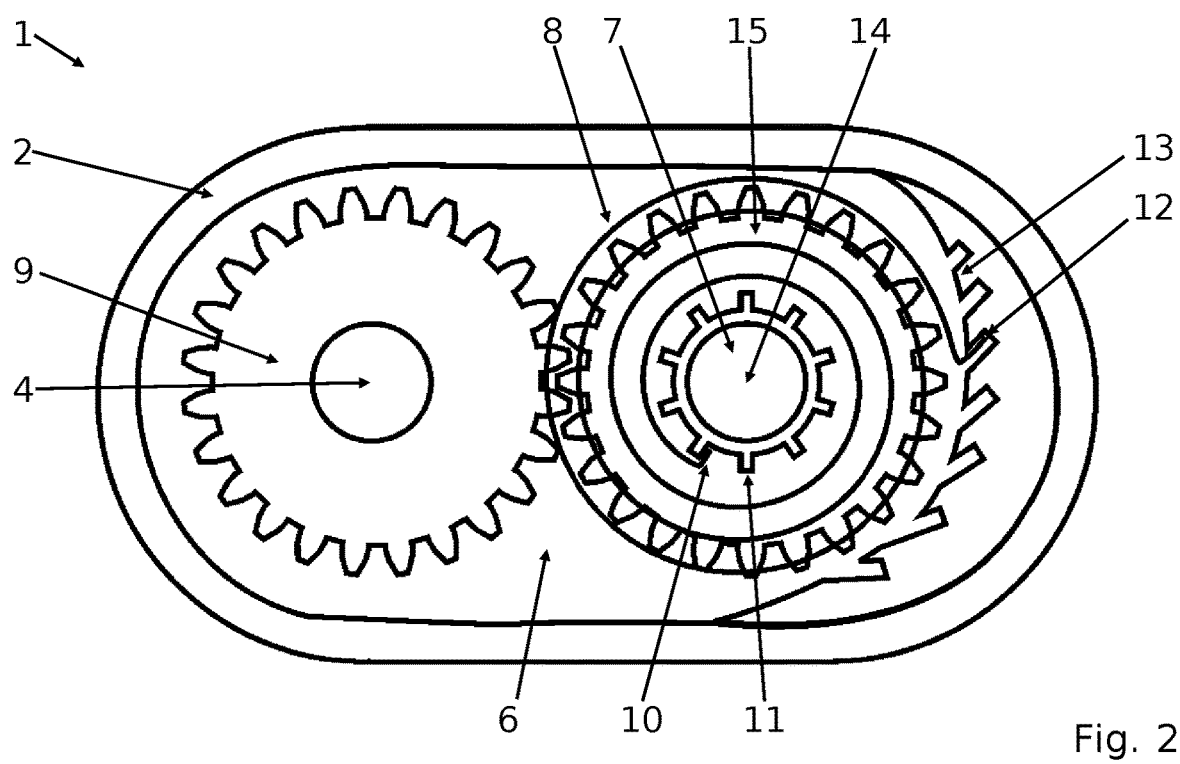

As illustrated in FIG. 1 and FIG. 2, a controlling device 1 according to the invention comprises a housing 2 in which a drive shaft 4 and an output shaft 7 are arranged spaced apart from one another. In this embodiment, the drive shaft 4 and the output shaft 7 are aligned so as to be substantially parallel with respect to their rotation axes 14 or respectively axial axes. The respective axial axis runs through the respective symmetry axis of the cylindrical drive shaft 4 and output shaft 7. The housing 2 has bearings, which are not illustrated, for the drive shaft 4 and the output shaft 7, wherein the bearings are configured so that the drive shaft 4 and the output shaft 7 are mounted rotatably about their rotation axes 14, but are not displaceable along their respective axial axis.

The drive shaft 4 in fact penetrates the housing 2 in FIG. 1 at two locations, however provision can also be made that the drive shaft 4 is mounted entirely within the housing 2, in order to achieve as compact a structure of the controlling device 1 as possible. In contrast thereto, the output shaft 7 must penetrate the housing 2 at at least one location, so that an actuator 5 can be arranged on it in a torque-proof manner outside the housing 2, in order to mechanically actuate a component which is not illustrated. On a rotational movement of the output shaft 7, the actuator 5 carries out a pivoting movement about the rotation axis 14 of the output shaft 7 and transfers the component, which is not illustrated, into a desired position. The component which is to be actuated by means of the controlling device 1 can be a flap device or valve device in an intake system of an internal combustion engine, e.g. with at least one throttle valve, swirl flap or tumble flap, or in a turbocharger of the internal combustion engine, such as e.g. a wastegate valve. The component can also be a VTG, therefore a variable turbine geometry of an exhaust gas turbocharger.

The drive shaft 4 and the output shaft 7 are drivingly connected via a gear 6, wherein the gear 6 is configured as a spur gear and has a first gearwheel 9, which is connected to the drive shaft 4 in a torque-proof manner, and a further gearwheel, which is configured as output wheel 15 and is connected to the output shaft 7 in a torque-proof manner. In contrast to the diagrammatic illustration in FIG. 1 and FIG. 2, provision can be made that the gearwheel 9 and the output wheel 15 have different diameters, wherein it is expedient that a high transmission is achieved from the drive shaft 4 to the output shaft 7, in order to generate, with a low torque on the drive shaft 4, a higher torque on the output shaft 7, which is at least suitable to transfer the component, which is not illustrated, with the actuator 5 into a desired position. Therefore, provision can be made that the gearwheel 9 has a smaller diameter than the output wheel 15. Provision can also be made that at least one further gearwheel, which is configured as intermediate wheel, is arranged in the gear 6 between the drive shaft 4 and the output shaft 7, in order to provide a suitable transmission.

The controlling device 1 has an electric motor 3, which is arranged within the housing 2. The drive shaft 4 penetrates a rotor, not illustrated, of the electric motor 3 and is connected to the latter in a torque-proof manner. The electric motor 3 can be embodied as a stepping motor which comprises a motor housing which is able to be fixed to the housing 2. Within the motor housing, a stator, which is not illustrated, can be provided, in which the rotor is rotatably mounted. Through a suitable activation of the electric motor 3, which can take place via a control unit, which is not illustrated, the rotor, and thereby the drive shaft 4, is set into a rotational movement. Here, at least one communicating connection exists between the electric motor 3 and the control unit.

Provision can be made that the electric motor 3 brings about this rotational movement for a predetermined time, or that the electric motor 3 carries out this rotational movement so that a predetermined angle is swept over by the drive shaft 4. The rotational movement or respectively the torque of the drive shaft 4 is transferred via the gear 6 to the output shaft 7 and, in so doing, is transmitted, wherein the output shaft 7 in turn sets the actuator 5 into a pivoting movement. Here, the actuator 5 is transferred from the predetermined starting position into a predetermined final position or vice versa.

So that the actuator 5 of the controlling device 1 is moved into the predetermined starting position in the case of a failure of the electric motor 3, so that a well-defined state or respectively a failsafe position of the component which is to be actuated occurs, a return spring 8 is provided within the housing 2. Here, the return spring 8 prestresses the actuator 5 with a predetermined minimum restoring force into the starting position.

The return spring 8 is configured as a spiral spring with several windings, which describes at least partially an Archimedeal spiral and is arranged concentrically to the rotation axis 14 of the output wheel 15. At the inner end of the return spring 8, a gearwheel holder 10 is formed and at the outer end of the return spring 8 a housing holder 12 is formed. Between the return spring 8 and the gearwheel holder 10 or respectively the housing holder 12, a bending site is respectively provided, in which the material of the return spring 8 has a smaller bending radius compared to the bending radius of the windings of the spiral spring. The bending direction of the gearwheel holder 10 corresponds here to the bending direction of the windings of the spiral spring, whereas the bending direction of the housing holder 12 is opposed to the bending direction of the windings of the spiral spring.

On the output wheel 15 several gearwheel stops 11 are formed, which are arranged adjacent to one another in circumferential direction with respect to the output wheel 15. The gearwheel holder 10 of the return spring 8 is in engagement with one of the gearwheel stops 11. The gearwheel stops 11 can be formed as recesses and/or as projections, wherein the gearwheel stops 11 can be spaced apart equidistantly from one another in circumferential direction with respect to the output wheel 15. However, provision can also be made that the gearwheel stops 11 are not spaced apart equidistantly from one another.

On the housing 2 several housing stops 13 are provided, which are arranged adjacent to one another in circumferential direction with respect to the output wheel 15. The housing holder 12 of the return spring 8 is in engagement with one of the housing stops 13. The housing stops 13 can be formed as recesses and/or as projections, wherein the housing stops 13 can be spaced apart equidistantly from one another in circumferential direction with respect to the output wheel 15. However, provision can also be made that the housing stops 13 are not spaced apart equidistantly from one another. The housing stops 13 can be formed by the housing 2 itself or also for example by a component which is able to be inserted into the housing 2 and which has the corresponding housing stops 13.

Provision can be made that the spacing of the gearwheel stops 11 and/or of the housing stops 13 is a multiple, in particular a whole multiple, of the gearwheel pitch of one of the gearwheels of the gear 6.

The return spring 8 is inserted during mounting of the controlling device 1 so that the gearwheel holder 10 and the housing holder 12 engage into a suitable gearwheel stop 11 or respectively housing stop 13, in order to generate a deflection of the return spring 8 from its unstressed neutral position, so that with the electric motor 3 disconnected, the actuator 5 is prestressed with a predetermined minimum restoring force in the starting position. For this, the return spring 8 can be measured before inserting into the housing 2, in order to determine the deflection required for a predetermined restoring force. Through the selection of the suitable gearwheel stop 11 or respectively housing stop 13, an installation position of the return spring 8 can be selected, in which the manufacturing deviations of the return spring 8 are compensated, so that a predetermined minimum restoring force is always present.

A fine adjustment of the deflection of the return spring 8 in the installation position in the controlling device 1 can be achieved in that before the torque-proof connecting of the actuator 5 to the output shaft 7, the output shaft 7 is first turned, for further prestressing of the return spring 8, so far until the return spring 8 assumes in its installation position a mounting rotation position relative to the housing 2 in which the desired minimum restoring force is generated on the output shaft 7. The output shaft 7 is held in this mounting rotation position of the return spring 8, wherein subsequently the actuator 5 is connected to the output shaft 7 in a torque-proof manner.

The electric motor 3 of the controlling device 1 must be designed so that in addition to the actuation of the component, it also can overcome the restoring elastic force of the return spring 8 in its installed position and, if applicable, additional mounting rotation position from the starting position up to the final position of the actuator 5. The deflection of the return spring 8 must always be selected so that in the case of a failure of the electric motor 3 the actuator can apply a sufficiently great force or respectively a sufficiently great torque, in order to transfer the component, which is to be actuated, into a well-defined state or respectively a failsafe position.

Figure 3:
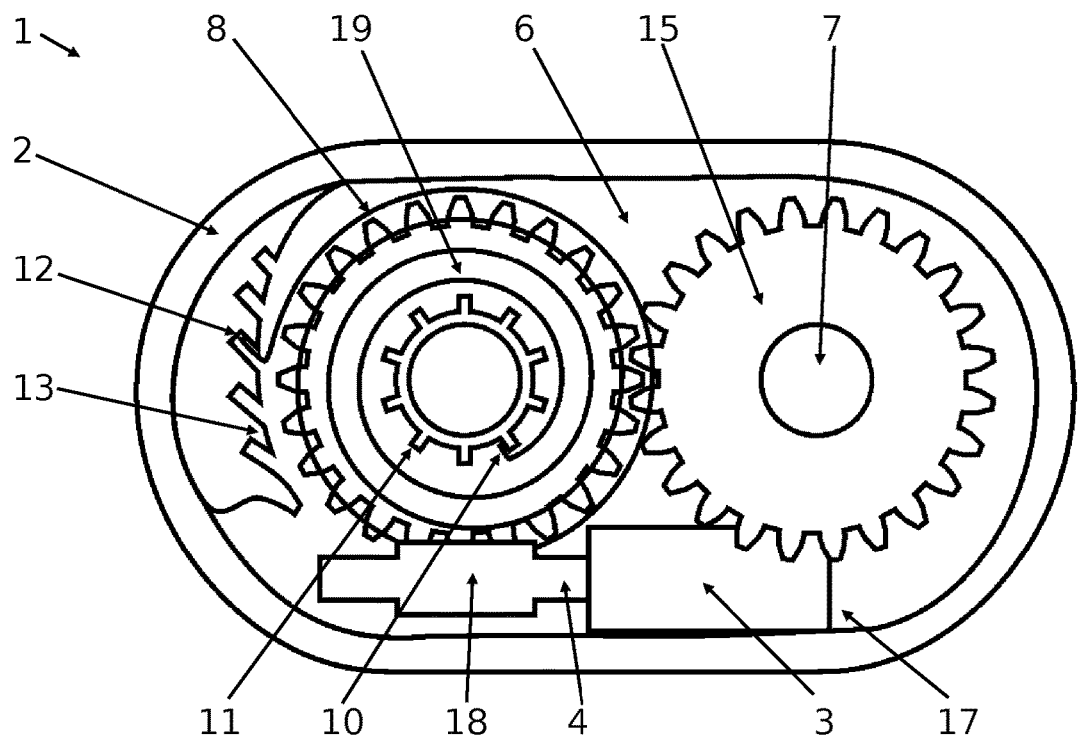

In FIG. 3 a second example embodiment of a controlling device 1 according to the invention is shown, which is equipped with a worm drive 17, which is arranged within the housing 2. The worm drive 17 comprises an electric motor 3 with a drive shaft 4, which at least partially penetrates the electric motor 3. The drive shaft 4 is connected to a worm 18 in a torque-proof manner, wherein the worm 18 is in engagement with a worm wheel 19. In this example embodiment, the worm wheel 19 is provided as an intermediate wheel, which is arranged between the worm 18 and the output wheel 15. In contrast to the example embodiment of FIG. 1 and FIG. 2, in this example embodiment the return spring 8 is not arranged on the output wheel 15, but rather on the worm wheel 19 or respectively on the intermediate wheel.

In this example embodiment, the drive shaft 4 and the output shaft 7 are not aligned in a parallel manner to one another, but rather are aligned transversely to one another through the use of the worm drive 17. Therefore, a particularly compact controlling device 1 can be produced, because the available spatial volume is utilized optimally. Through the use of the worm drive 17, a comparatively high transmission from the drive shaft 4 to the output shaft 7 is able to be achieved, so that the electric motor 3 which is required for the worm drive 17 can be compact and constructed with a low net weight.

The invention claimed is:

1. A controlling device for mechanically actuating a component, comprising:
 a housing,
 an electric motor, arranged in the housing, which has a drive shaft,
 an actuator arranged externally on the housing and for coupling with the component to be actuated,
 a gear, arranged in the housing, which drivingly connects the drive shaft to an output shaft, connected to the actuator in a torque-proof manner and penetrating the housing, and
 a return spring arranged in the housing, which in a case of a failure of the electric motor brings about a shifting of the actuator into a starting position,
 wherein the return spring is mounted in the housing so that the return spring prestresses the actuator with a predetermined minimum restoring force into the starting position, and
 wherein the gear has at least one gearwheel, the return spring has a gearwheel holder that is supported on a gearwheel stop formed on the gearwheel, and a housing holder that is supported onto a housing stop formed on the housing.

2. The controlling device according to claim 1, wherein the return spring is configured as a spiral spring that is arranged concentrically to the rotation axis of the gearwheel, and wherein the gearwheel holder is arranged at the inner end of the spiral spring, whereas the housing holder is arranged at the outer end of the spiral spring.

3. The controlling device according to claim 1, wherein on the housing several housing stops are formed, which are arranged adjacent to one another in a circumferential direction with respect to the gearwheel.

4. The controlling device according to claim 1, wherein on the gearwheel several gearwheel strops are formed, which are arranged adjacent to one another in a circumferential direction with respect to the gearwheel.

5. The controlling device according to claim 1, wherein the gearwheel is configured as an output wheel the is connected to the output shaft in a torque-proof manner.

6. The controlling device according to claim 1, wherein the gearwheel is configured as an intermediate wheel, which is arranged in the gear between the drive shaft and the output shaft.

7. The controlling device according to claim 1, wherein the gear has a worm drive, which has a worm connected to the drive shaft in a torque-proof manner, and a worm wheel in engagement with the worm, which worm wheel is connected to a coupling wheel in a torque-proof manner, which is in engagement with an output wheel, which is connected to the output shaft in a torque-proof manner.

8. The controlling device according to claim 6, wherein the intermediate wheel is formed by a worm wheel.

9. The controlling device according to claim 6, wherein the output wheel is configured as an intermediate wheel segment including teeth that extend in a circumferential direction over less than 180°.

10. A method for mounting a controlling device, comprising:
 providing a housing, an electric motor including a drive shaft, an actuator arranged externally on the housing, a gear drivingly connecting the drive shaft to an output shaft that is connected to the actuator in a torque-proof manner and penetrates the housing, and a return spring arranged in the housing that in a case of a failure in the electric motor brings about a shifting of the actuator into a starting position;
 rotating, before connecting the actuator to the output shaft with a stationary drive shaft in the torque-proof manner, the output shaft for prestressing the return spring until it assumes a mounting rotation position relative to the housing in which a desired minimum restoring force on the output shaft is reached;
 connecting, in which subsequently with the output shaft held in the mounting rotation position, the actuator to the output shaft in the torque-proof manner; and
 wherein the providing includes the gear having at least one gearwheel, the return spring having a gearwheel holder that is supported on a gearwheel stop formed on the gearwheel, and a housing holder that is supported onto a housing stop formed on the housing.

11. A method for mounting a controlling device, comprising:
 providing a housing, an electric motor including a drive shaft, an actuator arranged externally on the housing, a gear drivingly connecting the drive shaft to an output shaft that is connected to the actuator in a torque-proof manner and penetrates the housing, and a return spring arranged in the housing that in a case of a failure in the electric motor brings about a shifting of the actuator into a starting position, wherein the providing includes the gear having at least one gearwheel, the return spring having a gearwheel holder that is supported on a gearwheel stop formed on the gearwheel, and a housing holder that is supported onto a housing stop formed on the housing;

measuring the return spring, before inserting into the housing, to determine its deflection from its unstressed neutral state for generating a predetermined minimum restoring force;

selecting, based on the determined deflection, at least one of the housing stop and the gearwheel stop; and inserting the return spring into the housing so that at least one of:
the housing holder is in engagement with the selected housing stop, and
the gearwheel holder is in engagement with the selected gearwheel stop;

wherein the return spring is mounted in the housing so that the return spring prestresses the actuator with the predetermined minimum restoring force into the starting position.

12. The controlling device according to claim 3, wherein the return spring and the gearwheel are inserted into a mounting retainer, separate with respect to the housing, which has a retainer stop, on which the housing holder rests, the gearwheel is turned until the desired minimum restoring force is present in a mounting relative position of return spring and gearwheel, and the gearwheel and the return spring are transferred in the fixed mounting relative position from the mounting retainer into the housing, wherein the housing holder is brought into engagement with the best suited housing stop for maintaining the mounting relative position.

13. The controlling device according to claim 1, wherein a bending direction of the gearwheel holder corresponds to a bending direction of windings of at least one of the return spring and the spiral spring, whereas a bending direction of the housing holder is opposed to the bending direction of the windings of the at least one of the return spring and the spiral spring.

14. The controlling device according to one of claim 1, wherein at least one of:
the gearwheel stop is integrally formed by the gearwheel, and
the housing stop is integrally formed by the housing.

15. The method of claim 10, further comprising:
inserting the return spring and a gearwheel into a mounting retainer, separate with respect to the housing, which has a retainer stop, on which the housing holder rests;
turning the gearwheel until the desired minimum restoring force is present in a mounting relative position of return spring and gearwheel; and
transferring the gearwheel and the return spring in the fixed mounting relative position from the mounting retainer into the housing, wherein the housing holder is brought into engagement with the best suited housing stop for maintaining the mounting relative position.

16. The method of claim 10, further comprising:
measuring the return spring, before inserting into the housing, to determine its deflection from its unstressed neutral state for generating a minimum restoring force;
selecting, based on the determined deflection, at least one of a housing stop and a gearwheel stop; and
inserting the return spring into the housing so that at least one of:
the housing holder is in engagement with the selected housing stop, and
the gearwheel holder is in engagement with the selected gearwheel stop.

\* \* \* \* \*